(12) United States Patent
Ramirez

(10) Patent No.: US 10,221,985 B2
(45) Date of Patent: Mar. 5, 2019

(54) PIPE CAP WITH TRANSITION FITTING

(71) Applicant: Benjamin H. Ramirez, Goodyear, AZ (US)

(72) Inventor: Benjamin H. Ramirez, Goodyear, AZ (US)

( * ) Notice: Subject to any disclaimer, the term of this patent is extended or adjusted under 35 U.S.C. 154(b) by 75 days.

(21) Appl. No.: 15/411,354

(22) Filed: Jan. 20, 2017

(65) Prior Publication Data

US 2017/0284586 A1 Oct. 5, 2017

Related U.S. Application Data

(60) Provisional application No. 62/316,157, filed on Mar. 31, 2016.

(51) Int. Cl.
| | |
|---|---|
| *F16L 35/00* | (2006.01) |
| *F16L 55/115* | (2006.01) |
| *G21C 13/028* | (2006.01) |
| *G21C 13/067* | (2006.01) |
| *F16L 19/10* | (2006.01) |
| *F16L 37/18* | (2006.01) |

(52) U.S. Cl.
CPC ......... *F16L 55/1152* (2013.01); *F16L 19/103* (2013.01); *G21C 13/028* (2013.01); *G21C 13/0675* (2013.01); *F16L 35/00* (2013.01); *F16L 37/18* (2013.01); *Y02E 30/40* (2013.01)

(58) Field of Classification Search
CPC ......... F16L 19/08; F16L 19/065; F16L 37/18; F16L 35/00
USPC .................................. 285/312, 901; 138/89
See application file for complete search history.

(56) References Cited

U.S. PATENT DOCUMENTS

| | | | | | |
|---|---|---|---|---|---|
| 2,416,829 | A | * | 3/1947 | Hartley | F16L 55/1152 138/89 |
| 2,625,955 | A | * | 1/1953 | Day | F16L 55/1152 138/89 |
| 3,036,601 | A | * | 5/1962 | Fabian, Jr. | F16L 55/1152 138/89 |
| 3,070,128 | A | * | 12/1962 | Collins | F16L 19/10 138/89 |
| 3,425,452 | A | * | 2/1969 | Shaw | F16L 19/14 138/89 |
| 4,290,276 | A | * | 9/1981 | Knowles | F16L 29/00 285/3 |
| 4,688,830 | A | * | 8/1987 | Meisinger | F16L 17/02 285/901 |

(Continued)

*Primary Examiner* — David Bochna
(74) *Attorney, Agent, or Firm* — Royse Law Firm, PC

(57) ABSTRACT

A pipe cap assembly for a normally-sealed system includes a pipe cap having a base portion including two opposing, substantially parallel flat surfaces. The pipe cap includes a connector portion extending from the base portion. A fluid passage extends through both the base portion and connector portion. A transition cap may be releasably coupled to the connector portion for sealing the fluid passage during normal operation. A transition fitting provides periodic access to the sealed system and includes an access port at one end, and a tubular port and fastener at the other end. The tubular port and fastener releasably couple to the connector portion of the pipe cap to provide access. A drain hose, vent hose, or the like, may be easily coupled to the access port of the transition fitting. A test instrument may be coupled either to the access port or directly to the connector portion.

11 Claims, 8 Drawing Sheets

(56) References Cited

U.S. PATENT DOCUMENTS

| | | | | |
|---|---|---|---|---|
| 4,893,846 | A * | 1/1990 | McGraw | F16L 19/063 |
| | | | | 285/901 |
| 4,923,221 | A * | 5/1990 | Taylor | F16L 55/1152 |
| | | | | 285/901 |
| 5,269,342 | A * | 12/1993 | Portis | F16L 55/1152 |
| | | | | 138/89 |
| 6,131,963 | A | 10/2000 | Williams et al. | |
| 6,629,708 | B2 | 10/2003 | Williams et al. | |
| 6,746,055 | B1 * | 6/2004 | Wood | F16L 19/062 |
| | | | | 285/249 |
| 8,146,953 | B2 * | 4/2012 | Nakata | F16L 19/10 |
| | | | | 138/89 |
| 2013/0181445 | A1 * | 7/2013 | Glime | F16L 19/065 |
| | | | | 285/337 |

* cited by examiner

PIPE CAP WITH TRANSITION FITTING

CROSS-REFERENCE TO RELATED PATENT APPLICATIONS

This non-provisional patent application claims the benefit of prior-filed U.S. provisional patent application No. 62/316,157, filed on Mar. 31, 2016, under 35 U.S.C. 119(e).

BACKGROUND OF THE INVENTION

Technical Field

This invention relates generally to apparatus and methods for venting, draining, and re-filling fluids from and to a normally sealed system, for example, a nuclear power plant, and more particularly to a pipe cap assembly and related method which simplify, and increase the efficiency, of such operations.

State of the Art

There are many systems that normally operate as a sealed system, including without limitation, nuclear power plants, conventional fossil-fuel power plants, chemical processing plants, and refineries. Often, such sealed systems normally operate under elevated pressures. Scheduled periodic maintenance must be performed to prevent unscheduled outages. In some instances, such maintenance may include conducting test procedures, e.g., monitoring pressures at various points within the sealed system, without actually opening up the sealed system or stopping normal operation. In other instances, periodic maintenance may include stopping normal operations, and opening the system at one or more points to drain fluids, vent gases, flush lines, and/or re-fill lines with fluids. Even when periodic maintenance is performed, unexpected problems can arise that require that the system be taken down for unscheduled maintenance, sometimes known as an "outage".

As mentioned above, nuclear power plants are one example of a sealed system that requires such maintenance. There are generally two types of nuclear power plants. A first type of nuclear power plant is a pressurized water reactor (PWR) type, wherein a coolant fluid, e.g., water, is circulated through a closed loop in a highly-pressurized primary circuit between the core of a nuclear reactor and one or more steam generators. The super-heated primary coolant, which may reach 300 degrees Centigrade, is used to boil water within the secondary side of the steam generator. The water boiled in the secondary side of the steam generator flows through a secondary circuit that utilizes steam turbines to produce electricity.

The second type of nuclear power plant is known as a boiling water reactor (BWR) type, wherein the reactor core directly heats water which turns to steam used to drive steam turbines; in this type of reactor, the primary and secondary circuits are effectively merged together.

During a refueling and maintenance outage of a nuclear power plant, it is necessary to drain the reactor coolant system pipes, safety injection pipes and supporting systems. Current drain and vent pipes typically include a shut-off valve which terminates in a pipe nipple having a threaded end opposite the valve. A conventional pipe cap is normally tightened over the threaded end of the pipe nipple. Such conventional pipe caps typically have a cylindrical outer surface.

In order to drain the reactor coolant and other fluids from these pipes, the pipe cap must first be removed from the pipe nipple utilizing a pipe wrench. Such conventional pipe caps are occasionally misplaced, or fall into inconvenient places, after removal during maintenance operations; in those instances, valuable time must be spent replacing or retrieving such pipe caps before the system may be re-started.

After removing the conventional pipe cap with the pipe wrench, a temporary cam lock fitting or similar fitting must then be attached to the threaded end of the pipe nipple, and a hose having a complementary cam lock fitting is attached to the temporary cam lock fitting in order to drain the pipe. This is a labor intensive process that must be performed using protective clothing to minimize contamination exposure of workers from the radiation emitted from the nuclear reactor and the fluids that circulate therethrough. Title 10, Part 20, of the Code of Federal Regulations (10 CFR Part 20), entitled "Standards for Protection Against Radiation," establishes the dose limits for radiation workers. Section 20.1003 sets forth "ALARA" standards (ALARA is an acronym for "as low as (is) reasonably achievable") requiring nuclear power plant operators to make every reasonable effort to maintain exposures to ionizing radiation as far below the maximum radiation dose limits as practical. Generally speaking, the more time it takes to perform the drain operation, the higher the dose of radiation to which such workers are exposed. Indeed, time of exposure is one of the three critical factors (i.e., time, distance and shielding) when controlling the exposure of nuclear plant workers to radiation. In addition, the longer it takes to drain and re-fill the pipes within the system, the longer is the outage, which often translates into larger losses of revenue.

Accordingly, there is a need in the field of pipe caps used to seal drain pipes and vents within sealed systems, like power plants and the like, for an improved pipe cap that shortens the time needed to drain, vent, and re-fill the pipes within such plants.

There is also a need for an improved pipe cap that may be used to seal, and un-seal, such pipes more quickly and conveniently for improved worker safety and greater profitability.

There is a further need for an improved pipe cap that will not be misplaced, or fall into inconvenient places, during maintenance operations.

There is a still further need for such an improved pipe cap that is relatively inexpensive and simple to manufacture.

SUMMARY OF THE INVENTION

Briefly described, and in accordance with preferred embodiments thereof, a first aspect of the present invention relates to an improved pipe cap assembly which facilitates periodic access to a normally-sealed system. The improved pipe cap assembly includes a pipe cap having a base portion and a cylindrical connector portion. The base portion of the pipe cap has a threaded port for engaging a mating threaded port of the normally-sealed system, e.g., engaging a threaded end of a pipe nipple extending from a shut-off valve. This threaded port of the base portion extends along a longitudinal axis, and the base portion also includes two or more substantially flat, external surfaces formed thereon, each extending parallel to the longitudinal axis of the threaded port, for being gripped by a tool. Thus, when attaching the base portion of the pipe cap to the threaded end of a pipe nipple, a simple flat open-end wrench will suffice. The cylindrical connector portion of the pipe cap is coupled to the base portion and extends therefrom. An opening extends through the cylindrical connector portion in communication with the threaded port of the base portion. The cylindrical connector portion may extend coaxially with the base portion, or may extend at an angle therefrom.

The improved pipe cap assembly also includes a transition cap for being releasably coupled to the cylindrical connector portion of the pipe cap to seal the opening in the cylindrical connector portion when access is not required to the normally-sealed system. In the preferred embodiment, the cylindrical connector portion of the pipe cap includes exterior threads, and the transition cap has mating interior threads adapted to threadedly-engage the cylindrical connector portion of the pipe cap. Preferably, the transition cap also has two or more flats formed upon its exterior so that it may also be fastened or removed using a conventional flat open-end wrench. Also, in the preferred embodiment, a lanyard extends between the transition cap and the pipe cap, whereby the transition cap is always at hand, even when unfastened from the pipe cap.

In a preferred embodiment, the transition cap includes a main body having an open end in which the interior threads are formed; this open end is adapted to be engaged over the cylindrical connector portion of the pipe cap. The opposing second end of the main body has a plug rotatably coupled thereto. First and second serially-arranged ferrules are disposed between the main body and the plug for sealing the plug to the main body when the transition cap is tightened over the cylindrical connector portion of the pipe cap. The optional lanyard described above may advantageously be coupled to the plug of the transition cap.

The improved pipe cap assembly further includes a transition fitting for use when access to the normally-sealed system is required. The transition fitting includes an access port having a passageway extending therethrough. The transition fitting also includes a tubular port that is coupled with the access port, and which communicates with the access port passageway. This tubular port is adapted to fit within the opening of the cylindrical connector portion of the pipe cap.

The transition fitting further includes a fastener that surrounds the tubular port, and which may be used to releasably, and sealingly, couple the tubular port of the transition fitting to the cylindrical connector portion of the pipe cap. In this regard, the fastener of the transition fitting preferably has interior threads adapted to threadedly-engage exterior threads formed upon the cylindrical connector portion of the pipe cap. In the preferred embodiment, the transition fitting further includes first and second serially-arranged ferrules disposed between the tubular port and the fastener for sealing the tubular port to the cylindrical connector portion of the pipe cap when the fastener of the transition fitting is tightened over the cylindrical connector portion of the pipe cap.

In this manner, when the transition cap is removed from the connector portion of the pipe cap, the tubular port of the transition fitting may be inserted into the cylindrical connector portion of the pipe cap, and the fastener may then be tightened to facilitate access to the normally-sealed system via the access port of the transition fitting. The access port of the transition fitting can take any number of forms, including by example a male cam lock member, a female cam lock member, a Thor-style pneumatic interchange coupler, or a Chicago-style hose coupler. A drain hose, vent hose, or supply hose, having a mating fitting, may then be easily coupled with the access port to perform whatever maintenance is required. This is particularly useful in draining pipes and vents of a power plant; in draining reactor coolant system pipes; in draining safety injection pipes; and in draining and re-filling other supporting systems of a nuclear power plant.

Another aspect of the present invention relates to a method of using a pipe cap assembly to periodically access a normally-sealed system. In practicing such method, an improved pipe cap is attached to a threaded fitting of the normally-sealed system; the improved pipe cap includes a connector portion with an opening extending therethrough. A transition cap is fastened over the connector portion of the pipe cap when the normally-sealed system does not require access. When access is required, the transition cap is removed from the connector portion of the pipe cap, after which a transition fitting is fastened to the connector portion of the pipe cap; the transition fitting includes a tubular port received within the connector portion of the pipe cap, and further includes an access port having a passageway extending therethrough. A device may be coupled to the access port of the transition fitting to gain access to the normally-sealed system, e.g., a drain hose for draining fluid, a vent hose for venting a fluid, a fluid supply hose for supplying a fluid, or even a test instrument (e.g., a pressure gauge). When maintenance is completed and/or access is no longer required, the transition fitting is removed from the connector portion of the pipe cap, and the transition cap is re-attached over the connector portion of the pipe cap to facilitate normal usage of the normally-sealed system.

Preferably, in practicing such method, the connector portion of the pipe cap is externally threaded, and the transition fitting includes a fastener that surrounds the tubular port and is internally-threaded. In this case, the step of fastening the transition fitting to the connector portion of the pipe cap includes tightening the internally-threads of the fastener over the external threads of the connector portion of the pipe cap.

The method of the present invention can be broadly applied to many different normally-sealed systems, including nuclear power plants, fossil-fuel power plants, refineries, and chemical processing plants. The method finds particular application to maintenance performed in conjunction with refueling a nuclear power plant, including draining and/or venting fluid from, or adding fluid to, a nuclear power plant during refueling of the nuclear power plant.

The foregoing and other features and advantages of the present invention will become more apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1A:
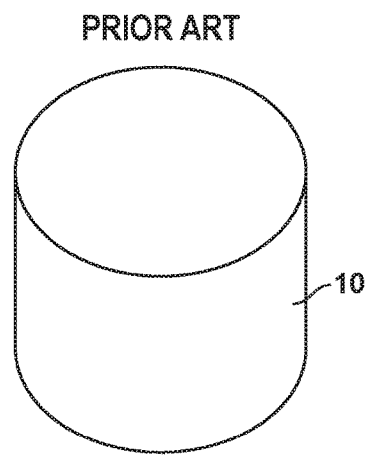
FIG. 1A is a perspective upper view of a prior art pipe cap.
Figure 1B:
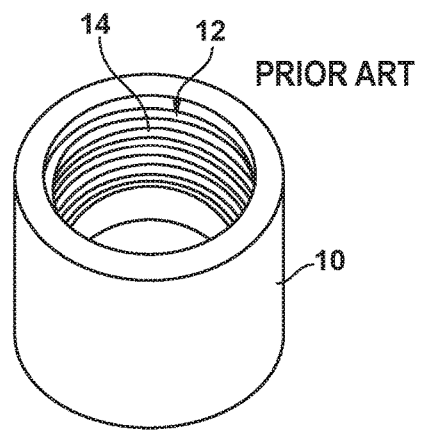
FIG. 1B is a perspective lower view of the prior art pipe cap of FIG. 1A.
Figure 5:
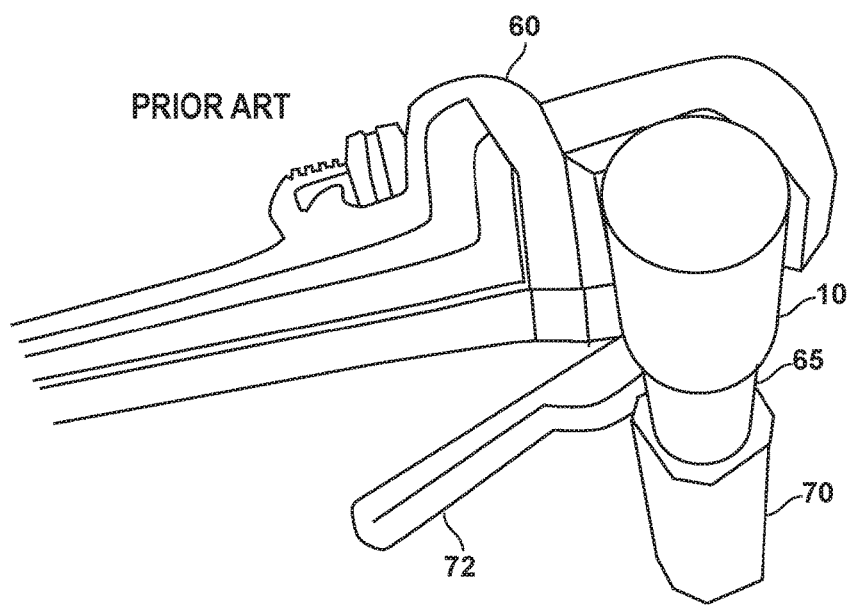
FIG. 5 is a perspective view of a prior art pipe cap being removed from a pipe nipple by a pipe wrench.

As shown in FIGS. 1A, 1B, and 5, a prior art pipe cap 10 has been used in the past to seal off a threaded end of a pipe nipple. Prior art pipe cap 10 includes an open bottom end 12 having threads 14 formed therein. Within FIG. 5, prior art pipe cap 10 is shown fastened to pipe nipple 65, extending from a shut-off valve 70 having a handle 72. In order to drain fluid from the system through pipe nipple 65, prior art pipe cap 10 must be removed, and shut-off valve 70 must be opened. A temporary fitting has then been installed over pipe nipple 65 in order to drain the line; this temporary fitting has, in some cases, included a male cam lock member for mating with a female cam lock member provided on the end of a drain hose.

As depicted in FIGS. 1A, 1B and 5, prior art pipe cap 10 has a cylindrical exterior surface, and the only practical way to remove prior art pipe cap 10 from the end of nipple 65 is by use of pipe wrench 60 shown in FIG. 5. The past required usage of pipe wrench 60 to remove and re-attach prior art pipe cap 10 to perform maintenance, e.g., draining of fluid has taken considerable time. Moreover, once prior pipe cap 10 is un-threaded and removed from pipe nipple 65, it may become misplaced, or it may fall into a location that is difficult to reach. Such prior art pipe caps are relatively heavy, and if dropped from an elevation, they could also injure a person below or damage equipment below. Any of such occurrences further slows the process of performing required maintenance and re-sealing the system.

Figure 2A:
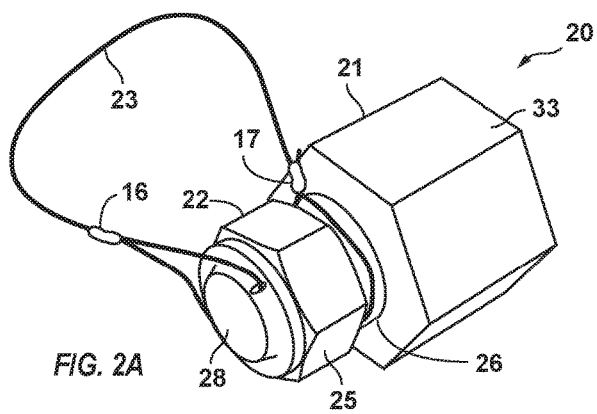
FIG. 2A is a perspective view of an improved pipe cap and attached transition cap for use with a pipe cap assembly, in accordance with embodiments of the present invention.
Figure 2C:
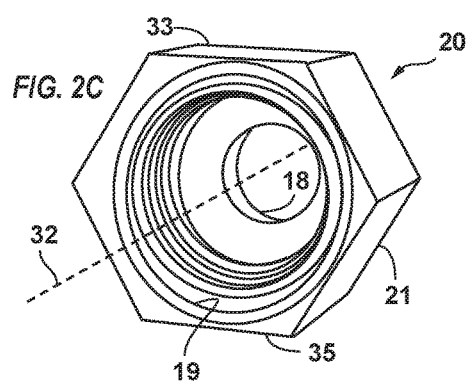
FIG. 2C is a perspective view of the pipe cap shown in FIGS. 2A and 2B, and illustrating the interior of the base portion thereof.
Figure 2B:
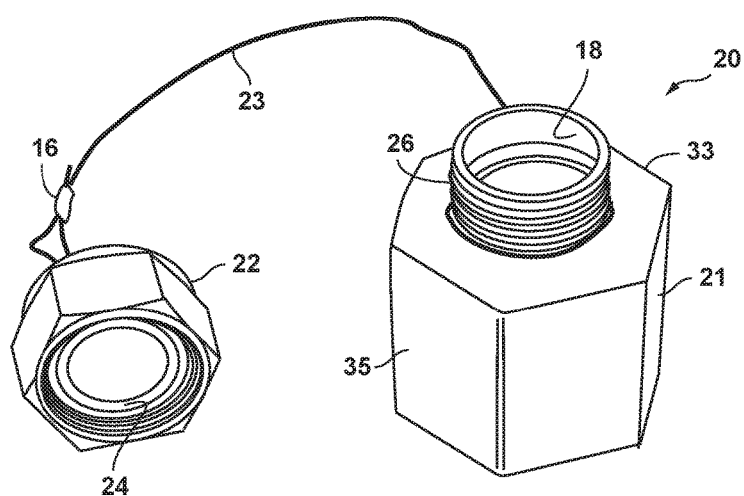
FIG. 2B is a perspective view of the pipe cap and transition cap of FIG. 2A, but with the transition cap detached from the pipe cap.

Referring now to FIGS. 2A-2C, an improved pipe cap 20 and associated transition cap 22 are shown in accordance with a preferred embodiment of the invention to help facilitate periodic access to a normally-sealed system. Improved pipe cap 20 is preferably formed as a unitary body having a hex-shaped base portion 21 and a cylindrical connector portion 26. As shown in FIG. 2C, a central bore 19 extends through base portion 21 of pipe cap 20 along longitudinal axis 32. The interior of central bore 19 has conventional pipe threads formed thereon to provide a threaded port for engaging, and mating with, exterior threads formed upon pipe nipple 65 (see FIG. 5) of the normally-sealed system. In addition, base portion 21 of pipe cap 20 includes six flat external surfaces arranged in a hexagonal pattern about longitudinal axis 32, including the two opposing flat surfaces designated as 33 and 35. Each of such flat surfaces extends parallel to longitudinal axis 32 of the threaded port formed in base portion 21. Thus, when initially installing base portion 21 of pipe cap 20 over the end of an existing pipe nipple, a flat open-end wrench, or box-end wrench, is all that is required to fasten pipe cap 20 to pipe nipple 65. The opposing flat surfaces (e.g., 33 and 35) are easily and reliably gripped by such open-end wrench.

Still referring to FIGS. 2A-2C, the cylindrical connector portion 26 of pipe cap 20 extends from base portion 21 centered along longitudinal axis 32. Connector portion 26 has a generally cylindrical outer surface upon which threads are formed. Preferably, the threads formed upon the outer wall of connector portion 26 are of a finer pitch than those formed within central bore 19 of base portion 21. Connector portion 26 surrounds a central opening 18 which is also centered upon longitudinal axis 32 in communication with threaded bore 19 of base portion 21. Thus, a central passageway, including central bore 19 and central opening 18, extends through pipe cap 20 from base portion 21 to connector portion 26 along longitudinal axis 32 (see FIG. 2C).

As shown in FIGS. 2A and 2B, a transition cap 22 is also provided for being fastened over connector portion 26 to seal central opening 18 when access to the sealed system is not required. Transition cap 22 may be releasably coupled to connector portion 26, as by forming threads 24 on the interior of transition cap 22 that mate with the external threads formed upon connector portion 26. As will be described in greater detail below, the thread pattern formed upon connector portion 26 and within transition cap 22 may be compatible with pipe fittings of the type supplied by Swagelok Company of Solon, Ohio under the registered trademark "SWAGELOK". The exterior periphery of transition cap 22 has a hexagonal shape, which again allows for tightening or loosening by using a simple open-ended box wrench.

As shown in FIGS. 2A and 2B, transition cap 22 is also preferably coupled by a lanyard 23 to pipe cap 20; in this way, transition cap 22 will always be at hand, and will not fall, even when transition cap 22 is removed from pipe cap 20; rather, transition cap 22 will simply hang, or dangle, from pipe cap 20. In the preferred embodiment, one end of lanyard 23 is doubled back upon itself to form a loop that is cinched about connector portion 26 and crimped by a deformable clip; the opposite end of lanyard 23 is secured to transition cap 22 in a manner to be explained below. Lanyard 23 is a safety drop-prevention technique which ensures that transition cap 22 does not fall from upper elevations to workers below, and further ensures that transition cap 22 is not lost during a draining or venting process of the pipe to which pipe cap 20 is secured.

When transition cap 22 is secured over connector portion 26 of pipe cap 20, as shown in FIG. 2A, and base portion 21 of pipe cap 20 is fastened over pipe nipple 65 (see FIG. 1), then pipe cap 20 and transition cap 22 essentially perform the same function, i.e., sealing the end of pipe nipple 65, as was performed by prior art pipe cap 10 shown in FIGS. 1A, 1B and 5. However, pipe cap 20 provides additional functionality as will be described in greater detail below.

Figure 3A:
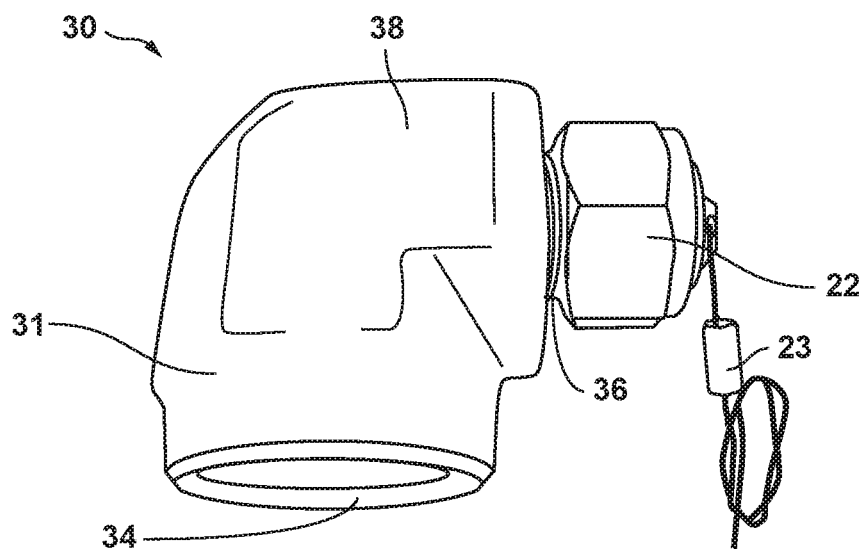
FIG. 3A is a side view of an alternate, angled form of the improved pipe cap and attached transition cap.
Figure 3B:
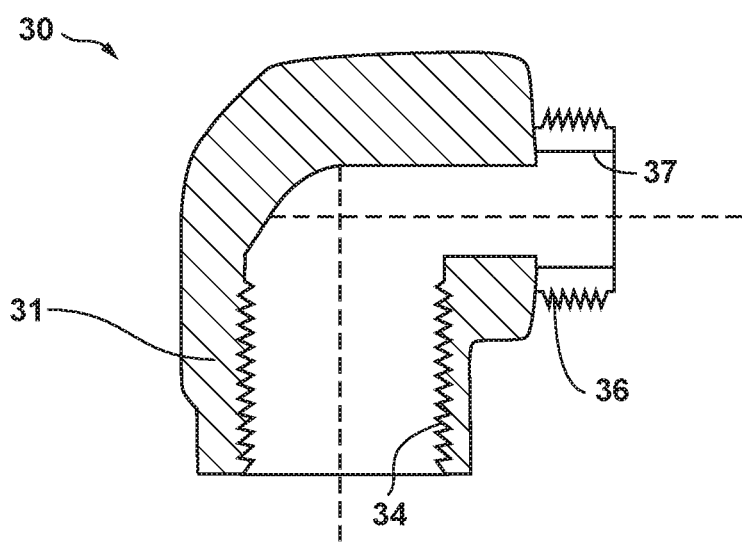
FIG. 3B is a cross-sectional view of the pipe cap shown in FIG. 3A.

In regard to pipe cap 20 described above, the central bore 19 of base portion 21 and the central opening 18 of connector portion 26 are coaxial to provide a relatively straight fluid passage therebetween. However, this need not be so. Referring to FIGS. 3A and 3B, pipe cap 30 includes a base portion 31 having threaded port 34, and a connector portion 36 surrounding opening 37. Pipe cap 30 has an elbow shape to form a ninety-degree angle in the flow path between the threaded port 34 in base portion 31 and the opening 37 within connector portion 36. Base portion 31 of pipe cap 30 includes two opposing, substantially parallel flat surfaces, one of which is designated 38 within FIG. 3A. Once again, the two opposing flat parallel surfaces allow for an open-end wrench to easily engage such surfaces for tightening or loosening threaded port 34 of pipe cap 30 to/from a pipe nipple of the normally sealed system. Like connector portion 26 of pipe cap 20, connector portion 36 of pipe cap 30 is cylindrical and has threads formed upon its outer surface. Opening 37 of connector portion 36 is in communication with the central bore of threaded port 34 of base portion 31; however, as shown in FIG. 3B, opening 37 extends along an axis that is generally perpendicular to the axis passing through threaded port 34. While pipe cap 30 provides a ninety-degree bend in the flow path, other pipe caps may be provided with a smaller bend in the flow path, e.g., a forty-five degree bend, if desired.

Like pipe cap 20, pipe cap 30 may also include a transition cap 22 for being releasably coupled to connector portion 36 for sealing opening 37 of connector portion 36 when access to the sealed system is not required. As in the case of pipe cap 20, a lanyard 23 is preferably provided for coupling transition cap 22 to connector portion 36 even when transition cap 22 has been removed from connector portion 36.

Figure 10:
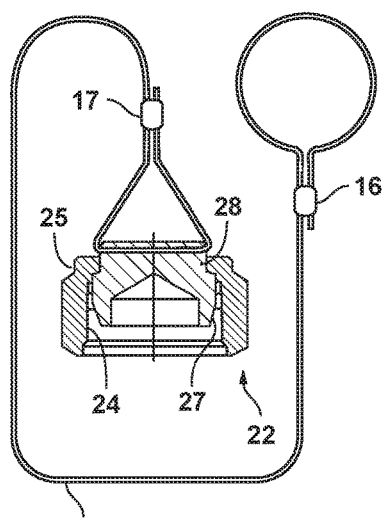
FIG. 10 is a cross-sectional view of the transition cap shown in FIGS. 2A and 2B, along with its associated lanyard.

Referring briefly to FIG. 10, a preferred form of transition cap 22 is shown. Transition cap 22 includes a main body 25 having internal threads 24 formed in the lowermost portion thereof, and including a circular opening in its uppermost portion. Plug 28 is rotatably supported within the circular opening in the uppermost portion of main body 25. A pair of serially-arranged ferrules (not shown) are interposed between main body 25 and plug 28. The lower portion of plug 28 includes a tapered, partially-conical surface 27. As transition cap 22 is tightened onto either connector portion 26 of pipe cap 20, or connector portion 36 of pipe cap 30, the end of such connector portion wedges itself between tapered surface 27 of plug 28 and main body 25. As the transition cap 22 is further tightened, the ferrules are compressed and form a leak-tight pressure seal between plug 28, main body 25, and the connector portion to which they are attached. As shown in FIG. 10, plug 28 preferably includes a lateral bore extending through its uppermost portion for receiving an end of lanyard 23; this end of lanyard 23 may be doubled-back upon itself and secured by crimping deformable clip 17. The opposite end of lanyard 23 may be formed into a loop for extending about a connector portion of a pipe cap (e.g., for extending about connector portion 26 of pipe cap 20) and secured by crimping deformable clip 16.

Figure 4A:
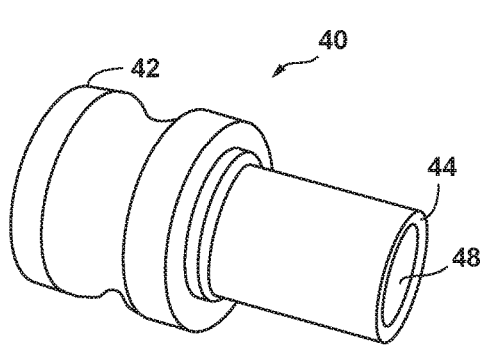
FIG. 4A is a perspective view of a transition fitting, in accordance with embodiments of the present invention, and incorporating a male cam lock member as its access port.
Figure 4B:
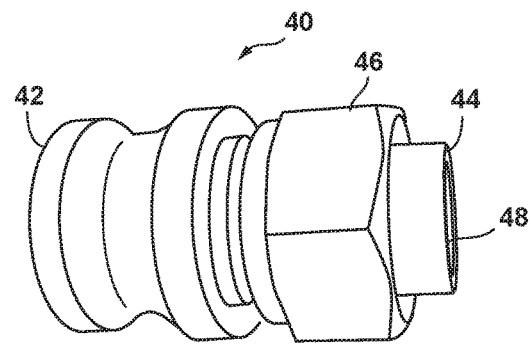
FIG. 4B is a perspective view of the transition fitting shown in FIG. 4A and including a fastener surrounding the tubular port of the transition fitting.
Figure 4C:
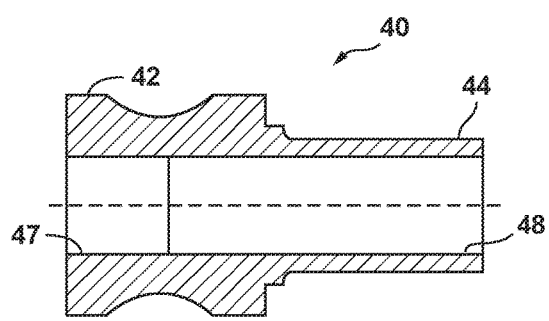
FIG. 4C is a cross-sectional drawing of the transition fitting shown in FIG. 4A.

Referring now to FIGS. 4A-4E, transition fitting 40 will now be described. Transition fitting 40 includes an access port 42 at one end and a tubular port 44 at its opposing end. Access port 42 is shown in FIGS. 4A-4C as a male cam lock fitting and includes a central passageway 47 extending therethrough. A number of suppliers provide such cam lock fittings, also known as cam and groove fittings, including Dixon Valve & Coupling Company of Chestertown, Md. Tubular port 44 has an outer diameter commensurate with the inner diameter of opening 18 in connection port 26 of pipe cap 20; in this manner, tubular port 44 is adapted to fit within opening 18 of cylindrical connector portion 26 of pipe cap 20. Tubular port 44 includes a central passageway 48 that communicates with central passageway 47 of male cam lock fitting 42. As shown in FIG. 4B, tubular port 44 has sufficient length to support thereon fastener 46, while still permitting a portion of tubular port 44 to extend beyond fastener 46.

Still referring to FIGS. 4A-4E, fastener 46 has a hexagonal exterior for allowing an open-end wrench to be used to rotate fastener 46 relative to a connector portion to which it will be attached. As shown best in FIG. 4D, fastener 46 has a first end 43 which lies closest to access port 42, and an opposing second end 49. First end 43 of fastener 46 has a central bore 45 formed therein of a diameter commensurate with the outer diameter of tubular port 44, allowing fastener 46 to be slid over and around tubular port 44; fastener 46 thereby surrounds the outer wall of tubular port 44. A larger-diameter bore 51 is formed in second end 49 of fastener 46, and threads are formed therein for mating with the external threads formed upon connector portion 26 of pipe cap 20.

When access is required to the normally-sealed system, transition cap 20 (see FIG. 2A) is first removed from connector portion 26 of pipe cap 20 (or from connector portion 36 of pipe cap 30), and hung by lanyard 23. Transition fitting 40 is then oriented to direct tubular port 44 toward opening 18 of connection portion 26, guiding the end of tubular port 44 into opening 18 until it seats against an inwardly-turned flange formed approximately 0.75 inches within opening 18. Fastener 46 is then rotated to engage its interior threads with the external threads formed upon connector portion 26, and further tightened until tubular port 44 is secured within connector portion 26. A flow path is then established between access port 42 and pipe nipple 65 (see FIG. 1), thereby facilitating access to the normally-sealed system via the access port.

Figure 4D:
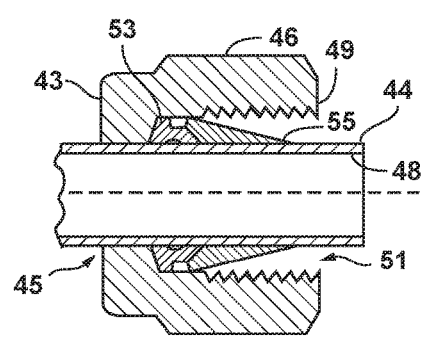
FIG. 4D is a cross-sectional drawing illustrating the manner the fastener of FIG. 4B, including first and second serially-arranged ferrules within the fastener.
Figure 4E:
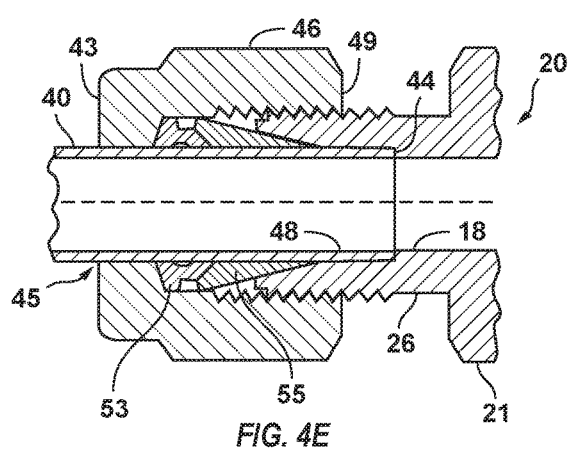
FIG. 4E is a cross-sectional drawing showing the fastener of FIG. 4D after being threadedly-engaged with the connector portion of the pipe cap of FIG. 2B.

Referring now to FIGS. 4D and 4E, a pair of serially-arranged ferrules 53 and 55 are captured within fastener 46, also surrounding tubular port 44. SWAGELOK® style fittings make use of such ferrules to form a pressure-tight fluid seal as fastener 46 is tightened over connector portion 26, releasably and sealingly coupling tubular port 44 of transition fitting 40 to connector portion 26 of pipe cap 20. Further details concerning the structure and operation of such ferrules are known to those skilled in the art, as exemplified by the description set forth within U.S. Pat. No. 6,131,963, issued on Oct. 17, 2000, and assigned to Swagelok Company of Solon, Ohio.

Figure 6:
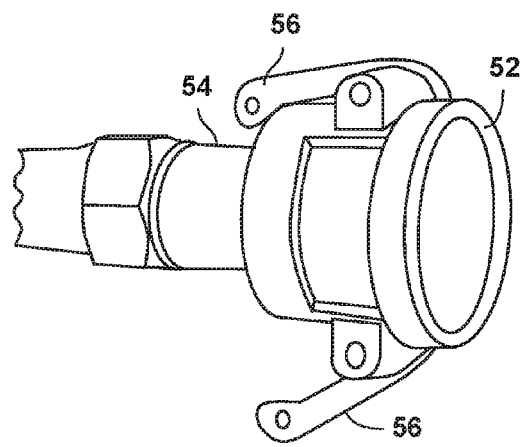
FIG. 6 is a perspective view of a drain hose including a female transition cam lock fitting.

Within the embodiment shown in FIGS. 4A-4C, access port 42 is formed as a male cam lock member. Referring to FIG. 6, a drain hose 54 is shown having a female cam lock member 52 coupled to one of its ends. Female cam lock member 52 of drain hose 54 may be inserted around male cam lock member 42 of FIGS. 4A/4B in a known manner, and the camming levers 56 of female cam lock member 52 may then be operated to couple drain hose 54 with transition fitting 40. The opposing end (not shown) of drain hose 54 may, in turn, be coupled to a drain manifold (not shown) for draining fluid from the normally-sealed system in order to perform required maintenance. Similarly, drain hose 54 could, instead, be a vent hose for venting gases from the system, or a supply hose for re-filling fluids into the normally-sealed system.

Figure 7A:
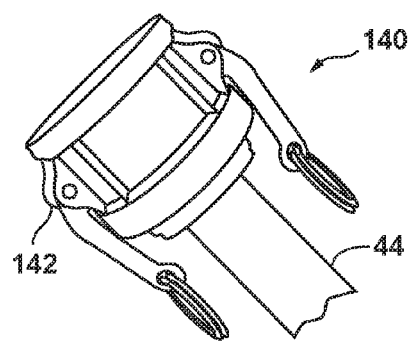
FIG. 7A is a partial perspective view of the access port of a transition fitting in accordance with the teachings of the present invention, and incorporating a female cam lock fitting.
Figure 7B:
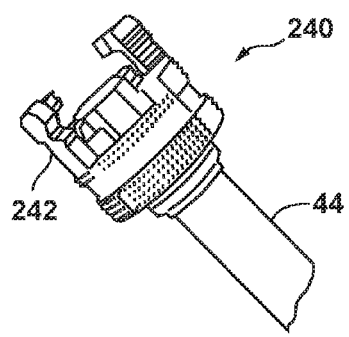
FIG. 7B is a partial perspective view of the access port of a transition fitting in accordance with the teachings of the present invention, and incorporating a Thor-style pneumatic interchange coupler.
Figure 7C:
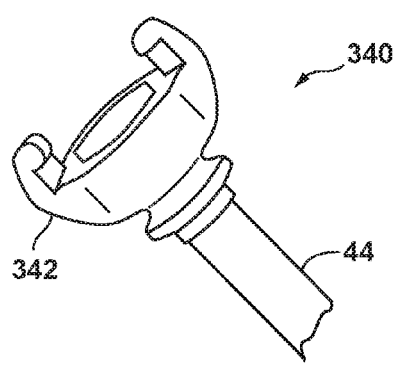
FIG. 7C is a partial perspective view of the access port of a transition fitting in accordance with the teachings of the present invention, and incorporating a Chicago-style hose coupler.

In FIGS. 4A-4C, access port 42 of transition fitting 40 is shown in the form of a male cam lock fitting. Those skilled in the art will further appreciate that, as shown in FIG. 7A, the access port of transition fitting 140 could instead be formed as a female cam lock member 142 for being coupled with a male cam lock member of a mating drain hose (not shown). Likewise, as shown in FIG. 7B, the access port of transition fitting 240 could alternately be formed as a Thor-style pneumatic interchange coupler 242 for being coupled with a like Thor-style pneumatic interchange coupler extending from the end of a mating drain hose (not shown). Such Thor-style couplers, also known as double-lock couplings, are commercially available from many suppliers, including Dixon Valve & Coupling Company of Chestertown, Md. FIG. 7C illustrates a further embodiment wherein the access port of transition fitting 340 is formed as a Chicago-style hose end coupler 342 for being coupled with a like Chicago-style hose end coupler provided at the end of a mating drain hose (not shown). Such Chicago-style hose end couplers are commercially available from many suppliers, including Dixon Valve & Coupling Company of Chestertown, Md., under the "Air King" brand name.

Figure 8A:
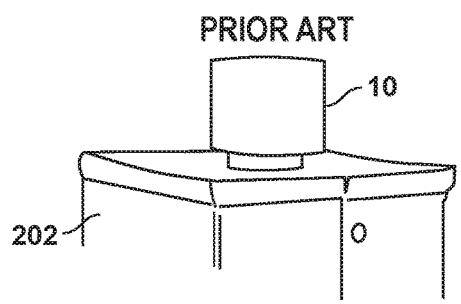
FIG. 8A is a perspective view of a prior art pipe cap coupled to a vent pipe.
Figure 8B:
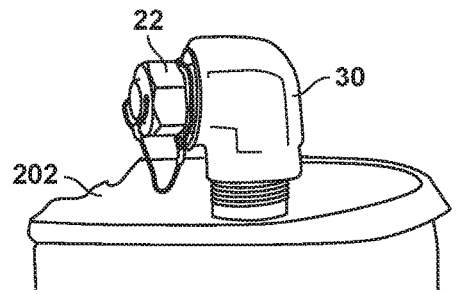
FIG. 8B is a perspective view of an improved pipe cap coupled to the vent pipe of FIG. 8A in accordance with an embodiment of the present invention.

FIG. 8A depicts a prior art pipe cap 10, identical to pipe cap 10 shown in FIGS. 1A, 1B and 5, coupled to a pipe nipple extending upwardly from a vent shut-off valve assembly 202 of a processing plant. FIG. 8B shows the shut-off valve assembly 202 from a different angle, and further shows elbow-style pipe cap 30 of FIG. 3A having replaced prior art pipe cap 10 of FIG. 8A; in FIG. 8B, transition cap 22 has been secured over the connector portion of pipe cap 30. When maintenance is required, transition cap 22 is removed from pipe cap 30, transition fitting 40 (see FIG. 4B) is connected to the connector portion of pipe cap 30, a vent hose is connected to the access port of the transition fitting, and shut-off valve 202 is opened to vent the system therethrough.

Figure 9A:
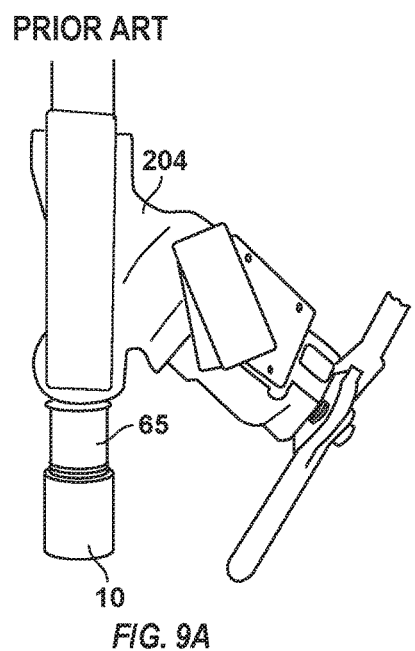
FIG. 9A is a perspective view of a prior art pipe cap coupled to a drain pipe.
Figure 9B:
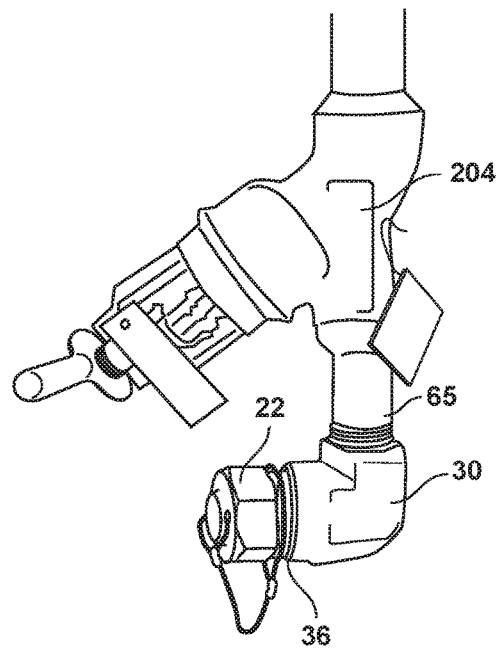
FIG. 9B is a perspective view of an improved pipe cap coupled to the drain pipe of FIG. 9A in accordance with an embodiment of the present invention.

FIG. 9A depicts a prior art pipe cap 10 coupled to a pipe nipple 65 extending downwardly from a drain valve 204 of a processing plant. FIG. 9B shows drain valve 204 from a different angle, and further shows straight-style pipe cap 20 of FIG. 2A having replaced prior art pipe cap 10 of FIG. 9A; in FIG. 9B, transition cap 22 has been secured over connector portion 36 of pipe cap 30. When maintenance is required, transition cap 22 is removed from pipe cap 30, transition fitting 40 (see FIG. 4B) is connected to connector portion 36 of pipe cap 30, a drain hose is connected to the access port of the transition fitting, and drain valve 204 is opened to drain the system therethrough.

The components of pipe caps 20 and 30, transition cap 22, and transition fitting 40 are preferably made from stainless steel. However, those skilled in the art will appreciate that such components may alternately be made from other suitable materials, including by way of example, zinc, magnesium, titanium, copper, iron, steel, carbon steel, alloy steel, tool steel, stainless steel, aluminum, any including combinations of such materials and/or alloys of such materials. Potentially, suitable materials are not limited to metals, and even non-metallic materials could be used provided that they exhibit reasonable strength, formablity, and durability. Such potential non-metallic materials may include glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials.

As already noted above, the improved pipe assembly disclosed herein may advantageously be applied to a wide variety of normally-sealed operating systems, including fossil fuel power plants using oil, gas or coal; nuclear power plants; refineries; chemical processing plants; and other types of processing plants using pipes or conduits that transfer fluid and/or are under pressure during normal operation. In the case of nuclear power plants, the improved pipe cap assembly may be used, for example, to facilitate refueling the nuclear power plant. The improved pipe cap assembly can be used, in conjunction with a drain hose, to efficiently drain fluid from the nuclear power plant during refueling of the nuclear power plant. Likewise, it may be used, in conjunction with a vent hose, to vent gases and pressurized fluids from the nuclear power plant during refueling of the nuclear power plant. Similarly, the improved pipe cap assembly may be used, in conjunction with a supply hose, to efficiently add fluid to the nuclear power plant during refueling of the nuclear power plant.

While the improved pipe cap assembly disclosed herein has been described thus far for use in draining, venting, and re-filling a normally sealed system, those skilled in the art will also appreciate that the novel pipe cap assembly may also be used to facilitate testing of a sealed system under normal operation, for example, to measure the pressure of fluid within the sealed system. A pressure gauge or other test instrument could be coupled to the improved pipe cap in at least two different ways. First, the sensing port of the test instrument could be coupled to the male cam lock fitting, or other form of access port provided on transition fitting 40; this method is best suited for lower pressure points within the sealed system. A second method of coupling the test instrument to the sealed system omits transition fitting 40; transition cap 22 is removed from the connector portion 26/36 of pipe cap 20/30, and the sensing port of the test instrument is provided with "SWAGELOK"-style internal threads for being tightened directly over connector portion 26/36. This second method is particularly well-adapted for use in measuring higher pressure points within the sealed system. Using this technique, a pressure gauge could be installed upon connector portion 26/36 of pipe cap 20/30, after which the associated shut-off valve is opened to expose such pressure gauge to existing line pressure while the processing plant is operating in its usual mode, all while maintaining an essentially sealed, pressurized system. At the end of the test, the shut-off valve is closed, the sensing port of the test instrument is removed from the connector portion of the pipe cap, and the transition cap is re-attached to the connector portion of the pipe cap.

It will be recalled that another aspect of the present invention relates to a method of using a pipe cap assembly to periodically access a normally-sealed system. This aspect of the present invention will be described in conjunction with FIGS. 11 and 12 of the drawings. As already noted, the normally-sealed system includes one or more threaded fittings, like pipe nipple 65 shown in FIG. 11. In practicing a preferred embodiment of the inventive method, a user attaches the base portion of pipe cap 20 to the threaded fitting of pipe nipple 65, as indicated by arrow 110 in FIG. 11, and by box 101 in FIG. 12. The user also initially attaches transition cap 22 over connector portion 26 of pipe cap 20, either before or after attaching pipe cap 20 to pipe nipple 65, as indicated by box 102 in FIG. 12. This is the usual status of pipe cap 20 and transition cap 22 when the sealed system is operating normally, access to the system is not required, and no testing is being performed.

Figure 11:
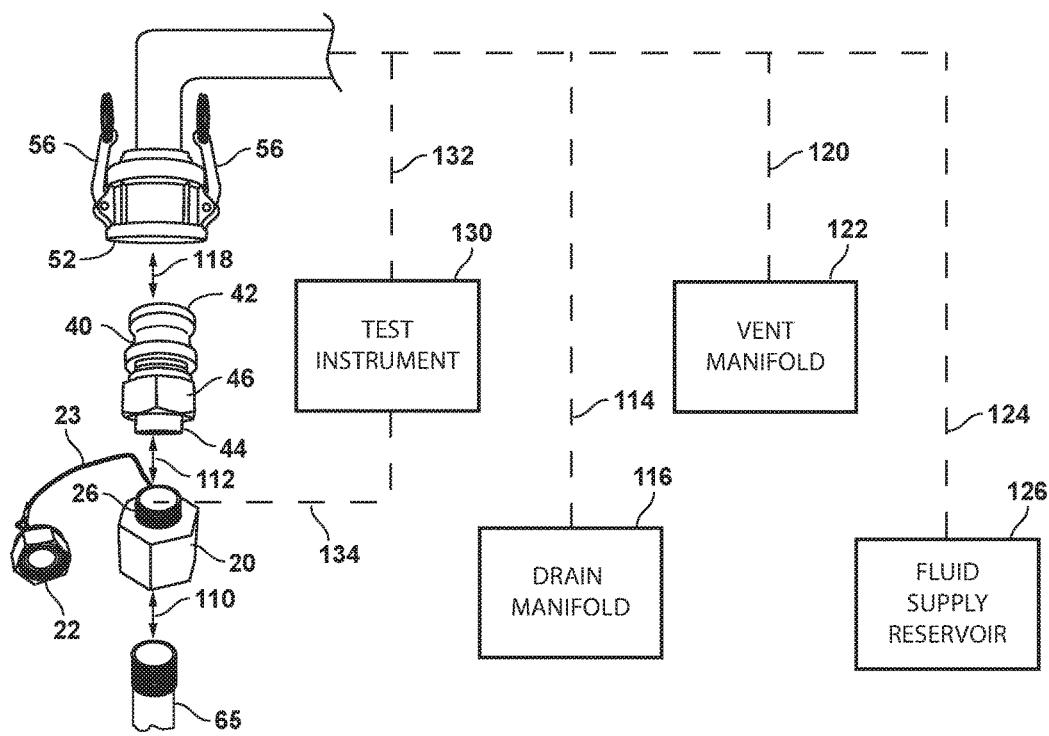
FIG. 11 is a schematic exploded view of an existing pipe nipple, an improved pipe cap assembly, and mating hose, in accordance with various embodiments of the present invention.
Figure 12:
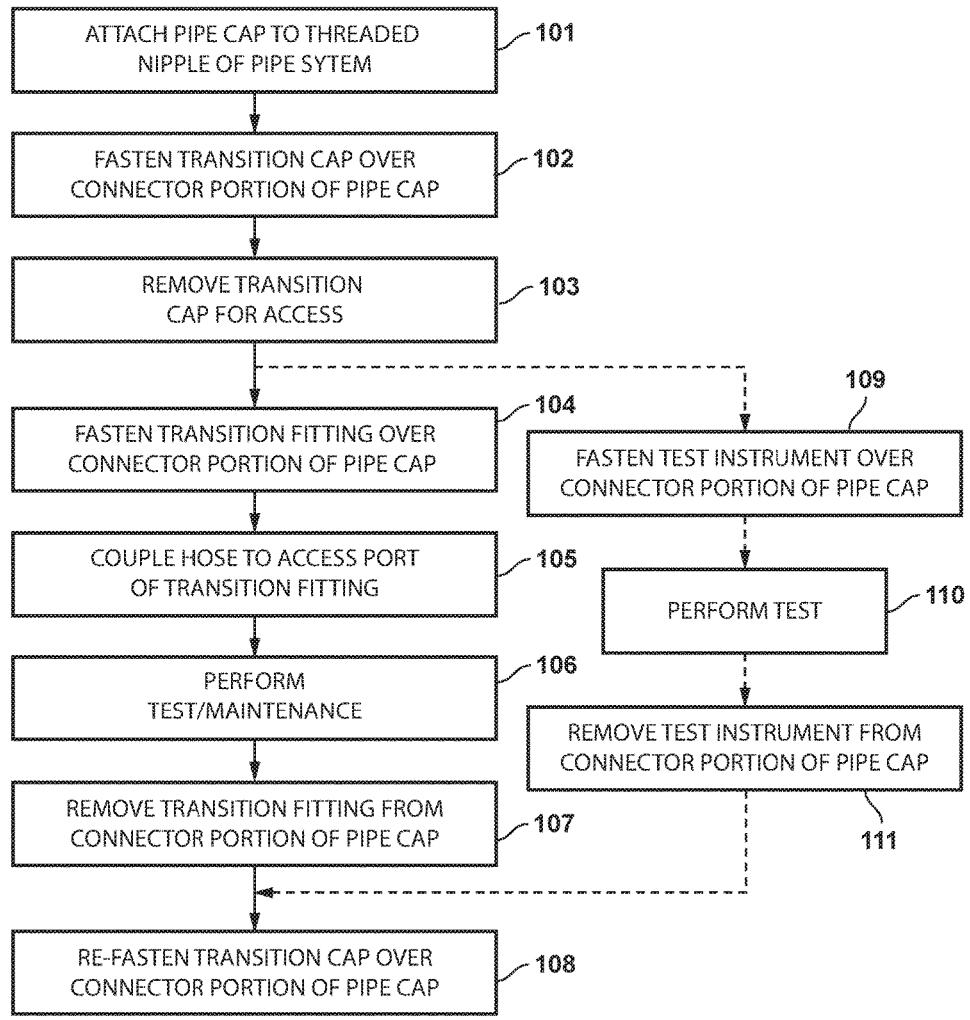
FIG. 12 is a flow chart of a method of using the improved pipe cap assembly in accordance with preferred embodiments of the present invention.

When access to the normally-sealed system is required, for example, when the system is taken down to perform maintenance, re-fueling, or the like, then transition cap 22 is removed from connector portion 26 of pipe cap 20, as indicated by box 103 in FIG. 12. It will be recalled that pipe nipple 65 extends from a shut-off valve (not shown in FIG. 11), and so long as the shut-off valve remains closed, no fluids/gases will escape from pipe cap 20 even when transition cap 22 is removed. After transition cap 22 is removed, tubular port 44 of transition fitting 40 is guided into connector portion 26 of pipe cap, 20, as indicated by arrow 112 in FIG. 11. Fastener 46 is threadedly-engaged over connector portion 26 and tightened to form a pressure-tight seal between transition fitting 40 and pipe cap 20, as indicated by box 104 in FIG. 12.

The steps which follow depend upon the type of maintenance being performed. For example, if fluid is to be drained from pipe nipple 65 of the normally-sealed system, then a drain hose 114 is provided; one end of drain hose 114 is connected to a drain manifold 116, as shown in FIG. 11. The other end of drain hose 114 may be provided with a female cam lock member 52 for being engaged over, and mating with, male cam lock member 42 on transition fitting 40, as represented by arrow 118 in FIG. 11 and by box 105 of FIG. 12. The shut-off/drain valve associated with pipe nipple 65 is then opened, and fluid may be drained to drain manifold 116, as represented by box 106 in FIG. 12. It will be understood that the male cam lock member 42 and female cam lock member 52 can be substituted for each other, if desired, and that other types of hose couplers (see FIGS. 7B and 7C) may be used in place of cam lock members.

If, on the other hand, pressurized fluid/gases are to be vented from the system through pipe nipple 65, then a vent hose 120 is provided; one end of vent hose 120 is connected to a vent manifold 122, as shown in FIG. 11. The other end of vent hose 120 may be provided with female cam lock member 52 for coupling with male cam lock member 42 on transition fitting 40, as represented by arrow 118 in FIG. 11 and by box 105 of FIG. 12. The shut-off/vent valve associated with pipe nipple 65 is then opened, and pressurized fluid/gases may be vented to vent manifold 118, as represented by box 106 in FIG. 12.

Similarly, if pipe nipple 65 is to be used for re-filling fluid into the normally-sealed system, then a supply hose 124 is provided; one end of supply hose 124 is connected to a fluid supply reservoir 126, as shown in FIG. 11. Fluid supply reservoir 126 may include a pump for causing such fluid to be under pressure. The other end of supply hose 124 may be provided with female cam lock member 52 for coupling with male cam lock member 42 on transition fitting 40, as represented by arrow 118 in FIG. 11 and by box 105 of FIG. 12. The shut-off/supply valve associated with pipe nipple 65 is then opened, and pressurized fluid may be supplied through supply hose 124, through transition fitting 40, through pipe cap 20, and through pipe nipple 65, into the system, as represented by box 106 in FIG. 12.

As noted above, a test instrument could also be coupled to the system through transition fitting 40, if desired. In this instance, the sensing port of the test instrument 130 includes a tube or hose 132. The end of tube 132 most distant from test instrument 130 may be provided with female cam lock member 52 for coupling with male cam lock member 42 on transition fitting 40, as represented by arrow 118 in FIG. 11 and by box 105 of FIG. 12. The shut-off/supply valve associated with pipe nipple 65 is then opened, and the sensing port of test instrument 130 is then able to measure the status of the system, as represented by box 106 in FIG. 12.

After any of the foregoing processes are completed, and no further maintenance or testing is required, the shut-off valve associated with pipe nipple 65 can be closed. The female cam lock member 52 is preferably removed from transition fitting 40 as a next step, though this is not required. In any event, tubular port 44 of transition fitting 40 is then removed from connector portion 26 of pipe cap 20, as indicated by box 107 of FIG. 12. Transition cap 22 is then returned to connector portion 26 of pipe cap 20 and tightened, as represented by box 108 in FIG. 12, until such time as access to the system is again required.

As described above, some test instruments may require access to a point in the system that normally operates under significant pressures, and in such instances, the test instrument should be coupled to the improved pipe cap without the use of a transition fitting. This option is indicated schematically in FIG. 11 wherein test instrument 130 includes a sensing port in the form of a tube 134 which terminates in a fastener having "SWAGELOK"-style internal threads for being tightened directly over connector portion 26 of pipe cap 20. Within FIG. 12, this option is indicated by the dashed line path that includes boxes 109, 110 and 111. After transition cap 22 is removed from pipe cap 20 (box 103), the sensing port of the test instrument is fastened directly over connector portion 26 of pipe cap 20, as indicated by box 109. The shut-off valve associated with pipe nipple 65 is then opened, and testing is performed, as represented by box 110. After testing is completed, the shut-off valve associated with pipe nipple 65 is once again closed, and the sensing port of the test instrument is removed from pipe cap 20, as indicated by box 111. Transition cap 22 is re-attached to connector portion 26 of pipe cap 20 (see box 108) and the sealed system continues to operate normally.

The present invention is particularly advantageous during a refueling and maintenance outage of a nuclear power plant, or of a reactor of such a nuclear power plant. In those instances, it is necessary to drain the reactor coolant system pipes, safety injection pipes and supporting systems. The disclosed pipe cap assembly and method can be used to drain pipes, vent pipes and refill pipes within the nuclear power plant during such a refueling and maintenance outage. The use of such an improved pipe cap assembly significantly reduces the time required to perform such maintenance, thereby better protecting employees of the power plant from excessive radiation, and also bringing the power plant back online much more quickly.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A pipe cap assembly for facilitating periodic access to a normally-sealed system, the pipe cap assembly comprising in combination:
    a pipe cap including:
        a) a base portion including a first threaded port for engaging a mating threaded port of the normally-sealed system, the first threaded port having a longitudinal axis, the base portion including at least two opposing, substantially flat, external surfaces each extending parallel to the longitudinal axis of the first threaded port for being gripped by a tool; and
        b) a cylindrical connector portion coupled to the base portion and extending therefrom, the cylindrical connector portion having a generally cylindrical outer surface surrounding an opening, the opening being in communication with the first threaded port of the base portion, and the cylindrical connector portion of the pipe cap including exterior threads formed thereupon;
    a transition cap releasably coupled to the cylindrical connector portion of the pipe cap for sealing the opening in the cylindrical connector portion when access is not required to the normally-sealed system, the transition cap having interior threads formed thereon for threadedly-engaging the cylindrical connector portion of the pipe cap; and
    a transition fitting including:
        a) an access port having a passageway extending therethrough;
        b) a tubular port coupled with the access port and communicating with the passageway of the access port, the tubular port being adapted to fit within the opening of the cylindrical connector portion; and
        c) a fastener surrounding, and coupled with, the tubular port for releasably, and sealingly, coupling the tubular port of the transition fitting to the cylindrical connector portion of the pipe cap, the fastener of the transition fitting having interior threads formed thereon for threadedly-engaging the cylindrical connector portion of the pipe cap;
    whereby, when the transition cap is removed from the connector portion of the pipe cap, the tubular port of the transition fitting may be received within the cylindrical connector portion of the pipe cap, and the fastener may be coupled with the cylindrical connector portion of the pipe cap, to facilitate access to the normally-sealed system via the access port.

2. The pipe cap assembly of claim 1 wherein the transition cap includes:
    a) a main body in which the interior threads are formed, the main body having a first open end for being engaged over the cylindrical connector portion of the pipe cap, and an opposing second end; and
    b) a plug rotatably coupled to the second end of the main body.

3. The pipe cap assembly of claim 2 further including a lanyard coupling the plug of the transition cap to the pipe cap.

4. The pipe cap assembly of claim 1 wherein the transition fitting further includes first and second serially-arranged ferrules disposed between the tubular port and the fastener for sealing the tubular port to the cylindrical connector portion of the pipe cap when the fastener of the transition fitting is tightened over the cylindrical connector portion of the pipe cap.

5. The pipe cap assembly of claim 1 wherein the opening of the cylindrical connector portion of the pipe cap is coaxial with the longitudinal axis of the first threaded port of the base portion to provide a relatively straight fluid passage therebetween.

6. The pipe cap assembly of claim 1 wherein the opening of the cylindrical connector portion of the pipe cap extends at an angle relative to the longitudinal axis of the first threaded port of the base portion to provide a relatively angled fluid passage between the first threaded port of the base portion and the opening in the cylindrical connector portion.

7. A pipe cap assembly for facilitating periodic access to a normally-sealed system, the pipe cap assembly comprising in combination:
    a pipe cap including:
        a) a base portion including a first threaded port for engaging a mating threaded port of the normally-sealed system, the first threaded port having a longitudinal axis, the base portion including at least two opposing, substantially flat, external surfaces each extending parallel to the longitudinal axis of the first threaded port for being gripped by a tool; and
        b) a cylindrical connector portion coupled to the base portion and extending therefrom, the cylindrical connector portion having a generally cylindrical outer surface surrounding an opening, the opening being in communication with the first threaded port of the base portion;
    a transition cap releasably coupled to the cylindrical connector portion of the pipe cap for sealing the opening in the cylindrical connector portion when access is not required to the normally-sealed system; and
    a transition fitting including:
        a) an access port having a passageway extending therethrough, wherein the access port of the transition fitting is a male cam lock member;
        b) a tubular port coupled with the access port and communicating with the passageway of the access port, the tubular port being adapted to fit within the opening of the cylindrical connector portion; and
        c) a fastener surrounding, and coupled with, the tubular port for releasably, and sealingly, coupling the tubular port of the transition fitting to the cylindrical connector portion of the pipe cap;
    whereby, when the transition cap is removed from the connector portion of the pipe cap, the tubular port of the transition fitting may be received within the cylindrical connector portion of the pipe cap, and the fastener may be coupled with the cylindrical connector portion of the pipe cap, to facilitate access to the normally-sealed system via the access port.

8. A pipe cap assembly for facilitating periodic access to a normally-sealed system, the pipe cap assembly comprising in combination:
    a pipe cap including:

a) a base portion including a first threaded port for engaging a mating threaded port of the normally-sealed system, the first threaded port having a longitudinal axis, the base portion including at least two opposing, substantially flat, external surfaces each extending parallel to the longitudinal axis of the first threaded port for being gripped by a tool; and b) a cylindrical connector portion coupled to the base portion and extending therefrom, the cylindrical connector portion having a generally cylindrical outer surface surrounding an opening, the opening being in communication with the first threaded port of the base portion;

a transition cap releasably coupled to the cylindrical connector portion of the pipe cap for sealing the opening in the cylindrical connector portion when access is not required to the normally-sealed system; and a transition fitting including:

a) an access port having a passageway extending therethrough, wherein the access port of the transition fitting is a female cam lock member;

b) a tubular port coupled with the access port and communicating with the passageway of the access port, the tubular port being adapted to fit within the opening of the cylindrical connector portion; and c) a fastener surrounding, and coupled with, the tubular port for releasably, and sealingly, coupling the tubular port of the transition fitting to the cylindrical connector portion of the pipe cap;

whereby, when the transition cap is removed from the connector portion of the pipe cap, the tubular port of the transition fitting may be received within the cylindrical connector portion of the pipe cap, and the fastener may be coupled with the cylindrical connector portion of the pipe cap, to facilitate access to the normally-sealed system via the access port.

9. A pipe cap assembly for facilitating periodic access to a normally-sealed system, the pipe cap assembly comprising in combination:

a pipe cap including:

a) a base portion including a first threaded port for engaging a mating threaded port of the normally-sealed system, the first threaded port having a longitudinal axis, the base portion including at least two opposing, substantially flat, external surfaces each extending parallel to the longitudinal axis of the first threaded port for being gripped by a tool; and b) a cylindrical connector portion coupled to the base portion and extending therefrom, the cylindrical connector portion having a generally cylindrical outer surface surrounding an opening, the opening being in communication with the first threaded port of the base portion;

a transition cap releasably coupled to the cylindrical connector portion of the pipe cap for sealing the opening in the cylindrical connector portion when access is not required to the normally-sealed system; and a transition fitting including:

a) an access port having a passageway extending therethrough, wherein the access port of the transition fitting is a Thor-style pneumatic interchange coupler;

b) a tubular port coupled with the access port and communicating with the passageway of the access port, the tubular port being adapted to fit within the opening of the cylindrical connector portion; and c) a fastener surrounding, and coupled with, the tubular port for releasably, and sealingly, coupling the tubular port of the transition fitting to the cylindrical connector portion of the pipe cap;

whereby, when the transition cap is removed from the connector portion of the pipe cap, the tubular port of the transition fitting may be received within the cylindrical connector portion of the pipe cap, and the fastener may be coupled with the cylindrical connector portion of the pipe cap, to facilitate access to the normally-sealed system via the access port.

10. A pipe cap assembly for facilitating periodic access to a normally-sealed system, the pipe cap assembly comprising in combination:

a pipe cap including:

a) a base portion including a first threaded port for engaging a mating threaded port of the normally-sealed system, the first threaded port having a longitudinal axis, the base portion including at least two opposing, substantially flat, external surfaces each extending parallel to the longitudinal axis of the first threaded port for being gripped by a tool; and b) a cylindrical connector portion coupled to the base portion and extending therefrom, the cylindrical connector portion having a generally cylindrical outer surface surrounding an opening, the opening being in communication with the first threaded port of the base portion;

a transition cap releasably coupled to the cylindrical connector portion of the pipe cap for sealing the opening in the cylindrical connector portion when access is not required to the normally-sealed system; and a transition fitting including:

a) an access port having a passageway extending therethrough, wherein the access port of the transition fitting is a Chicago-style hose coupler;

b) a tubular port coupled with the access port and communicating with the passageway of the access port, the tubular port being adapted to fit within the opening of the cylindrical connector portion; and c) a fastener surrounding, and coupled with, the tubular port for releasably, and sealingly, coupling the tubular port of the transition fitting to the cylindrical connector portion of the pipe cap;

whereby, when the transition cap is removed from the connector portion of the pipe cap, the tubular port of the transition fitting may be received within the cylindrical connector portion of the pipe cap, and the fastener may be coupled with the cylindrical connector portion of the pipe cap, to facilitate access to the normally-sealed system via the access port.

11. A pipe cap assembly for facilitating periodic access to a normally-sealed system, the pipe cap assembly comprising in combination:

a pipe cap including:

a) a base portion including a first port for engaging a mating port of the normally-sealed system; and b) a cylindrical connector portion coupled to the base portion and extending therefrom, the cylindrical connector portion having a generally cylindrical outer surface surrounding an opening, the opening being in communication with the first port of the base portion, and the cylindrical connector portion of the pipe cap including exterior threads formed thereupon;

a transition cap releasably coupled to the cylindrical connector portion of the pipe cap for sealing the opening in the cylindrical connector portion when access is not required to the normally-sealed system, the transition cap having interior threads formed thereon for threadedly-engaging the cylindrical connector portion of the pipe cap; and a transition fitting including:
  a) an access port having a passageway extending therethrough;
  b) a tubular port coupled with the access port and communicating with the passageway of the access port, the tubular port being adapted to fit within the opening of the cylindrical connector portion;
  c) a fastener surrounding, and coupled with, the tubular port for releasably, and sealingly, coupling the tubular port of the transition fitting to the cylindrical connector portion of the pipe cap, the fastener of the transition fitting having interior threads formed thereon for threadedly-engaging the cylindrical connector portion of the pipe cap; and first and second serially-arranged ferrules disposed between the tubular port and the fastener for sealing the tubular port to the cylindrical connector portion of the pipe cap when the fastener of the transition fitting is tightened over the cylindrical connector portion of the pipe cap whereby, when the transition cap is removed from the connector portion of the pipe cap, the tubular port of the transition fitting may be received within the cylindrical connector portion of the pipe cap, and the fastener may be coupled with the cylindrical connector portion of the pipe cap, to facilitate access to the normally-sealed system via the access port.

* * * * *